(12) United States Patent
Pettygrove et al.

(10) Patent No.: US 12,360,253 B2
(45) Date of Patent: Jul. 15, 2025

(54) QUALITY METRIC FOR GNSS BASED AZIMUTH MEASUREMENT IN AN ANTENNA ALIGNMENT DEVICE

(71) Applicant: Viavi Solutions Inc., Chandler, AZ (US)

(72) Inventors: Scott Pettygrove, Leesburg, VA (US); Matthew Lamb, Germantown, MD (US)

(73) Assignee: Viavi Solutions Inc., Chandler, AZ (US)

( * ) Notice: Subject to any disclaimer, the term of this patent is extended or adjusted under 35 U.S.C. 154(b) by 231 days.

(21) Appl. No.: 18/332,296

(22) Filed: Jun. 9, 2023

(65) Prior Publication Data
US 2024/0411031 A1    Dec. 12, 2024

(51) Int. Cl.
*G01S 19/25*    (2010.01)
*G01S 19/31*    (2010.01)
*G01C 22/00*   (2006.01)

(52) U.S. Cl.
CPC ............ *G01S 19/258* (2013.01); *G01S 19/31* (2013.01)

(58) Field of Classification Search
CPC ........ G01S 19/25; G01S 19/31; G01S 19/258; G01S 3/04; G01C 22/00
See application file for complete search history.

(56) References Cited

U.S. PATENT DOCUMENTS

| | | | | |
|---|---|---|---|---|
| 2009/0141623 | A1* | 6/2009 | Jung | H01Q 21/205 455/562.1 |
| 2011/0102255 | A1* | 5/2011 | Scherzinger | G01C 21/165 348/135 |
| 2011/0285584 | A1* | 11/2011 | Le Sage | H01Q 1/246 342/357.25 |

* cited by examiner

*Primary Examiner* — Tan Q Nguyen
(74) *Attorney, Agent, or Firm* — DLA Piper LLP (US)

(57) ABSTRACT

In addition to GNSS antennas, other azimuth measurement components such as magnetometers may be provided on antenna alignment devices. The GNSS based azimuth may then be compared against the azimuth measured by the other components and the difference (i.e., the delta) may be calculated. Using the calculated delta and or observing the delta over time, a quality metric is calculated. For example, a lower delta may correspond to a higher quality metric and the higher delta may correspond to a lower quality metric. The quality metric may then be displayed alongside the GNSS based azimuth. The quality metric may then be used by a technician to determine the level of trust (or confidence level) of the GNSS based azimuth.

20 Claims, 4 Drawing Sheets

QUALITY METRIC FOR GNSS BASED AZIMUTH MEASUREMENT IN AN ANTENNA ALIGNMENT DEVICE

BACKGROUND

Modern communication systems rely heavily on radio frequency wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents, which are carried through wires to the connected circuitry. Because of directional oscillation of electrical and magnetic fields, wireless signaling through transmittal and receipt of electromagnetic fields is inherently directional: heavily influenced by the location of the signal source, multipathing, beamforming, and or other aspects associated with electromagnetic fields and electromagnetic radiation. Antenna alignment may therefore be desired for optimizing bandwidth, signal strength, and or other transmit/receive parameters. Antenna alignment may generally be performed using antenna alignment devices.

A widely used technique for antenna alignment is global navigation satellite systems (GNSS) based alignment. An antenna alignment device may have a plurality of GNSS antennas (generally two) that communicate with GNSS satellites to determine the position and or orientation of the antenna alignment device. The determined position and or the orientation may then be used for aligning the antenna to a desired azimuth.

The problem, however, with GNSS based alignment is that GNSS measurements tend to wander. There may be radio frequency (RF) interferences or other unavoidable obstructions (e.g., tall buildings) in the measurement environment that may affect the view of the antenna alignment device's view of the GNSS satellite constellations. The wandering caused by these and other factors may be in the order of tens of seconds. Therefore, when the antenna alignment device displays that the GNSS azimuth calculation is locked and ready, the underlying measured values may be wandering. The displayed azimuth therefore will be inaccurate, thereby leading to inaccuracy
es in antenna alignments. These inaccuracies will cause communication problems such as e.g., less than desired bandwidth, lower signal to noise ratio, and or other undesirable effects.

As such, a significant improvement in GNSS based antenna alignment devices is desired.

SUMMARY

Embodiments disclosed herein solve the aforementioned problems and may provide other solutions as well. In one or more embodiments, alternate azimuth measurement components such as magnetometers may be provided on antenna alignment devices. The GNSS based azimuth may be compared against the azimuth measured by the alternate components and the difference, i.e., the delta, may be calculated and observed over time. Using the calculated delta and or the delta variance over time, a quality metric is calculated. For example, a lower delta and or delta variance over time may correspond to a higher quality metric and the higher delta and or delta variance over time may correspond to a lower quality metric. The quality metric may then be displayed alongside the GNSS based azimuth and or used by a technician to determine the level of trust (or confidence level) of the GNSS based azimuth.

In an embodiment, an antenna alignment device is provided. The antenna alignment device may comprise a plurality of GNSS antennas configured to receive signals from a constellation of GNSS satellites. The antenna alignment device may also comprise a plurality of components configured to measure non-GNSS based positional attributes of the antenna alignment device. The antenna alignment device may further comprise a processor configured to calculate a first azimuth value of the antenna alignment device based on the signals received by the plurality of GNSS antennas, calculate a second azimuth value of the antenna alignment device based on the non-GNSS based positional attributes, generate a quality metric for the first azimuth value based on comparing the first azimuth value and the second azimuth value, and cause a display of the first azimuth value and the quality metric.

In another embodiment, an antenna alignment device is provided. The antenna alignment device may comprise a plurality of GNSS antennas configured to receive signals from a constellation of GNSS satellites. The antenna alignment device may also comprise a plurality of components configured to measure non-GNSS based positional attributes of the antenna alignment device. The antenna alignment device may further comprise a processor configured to calculate an azimuth value of the antenna alignment device based on the signals received by the plurality of GNSS antennas, generate a quality metric for the azimuth value based on the non-GNSS based positional attributes, and cause a display of the azimuth value and the quality metric.

In yet another embodiment, a method of antenna alignment is provided. The method may comprise receiving, by a plurality of GNSS antennas in an antenna alignment device, signals from a constellation of GNSS satellites. The method may also comprise measuring, by a plurality of components in an antenna alignment device, non-GNSS based positional attributes of the antenna alignment device. The method may further comprise calculating, by a processor of the antenna alignment device, a first azimuth value of the antenna alignment device based on the signals received by the plurality of GNSS antennas; calculating, by the processor, a second azimuth value of the antenna alignment device based on the non-GNSS based positional attributes; generating, by the processor, a quality metric for the first azimuth value based on comparing the first azimuth value and the second azimuth value; and causing, by the processor, a display of the first azimuth value and the quality metric.

DETAILED DESCRIPTION OF SEVERAL EMBODIMENTS

One or more embodiments disclosed herein are directed to determining and displaying a quality metric (also referred to as quality score) for GNSS based azimuth measurements in an antenna alignment device. Although the GNSS based azimuth value may be shown as relatively stable, the underlying GNSS based geolocation measurements may wander due to factors such as RF interference, lack of visibility of the GNSS satellites, etc. Therefore, it may be beneficial for a technician to know the quality (or the level of trust) of the shown GNSS based azimuth measurement.

The quality metric may be generated based on an instantaneous measurement of the azimuth through other measurement mechanisms. For example, an array of magnetometers may be used to measure the earth's magnetic field, and the magnetic field measurement may be used to calculate an instantaneous azimuth. The instantaneous azimuth may then be compared with the GNSS based azimuth to determine the quality metric of the GNSS based azimuth. As an alternate or an addition to the magnetometer array, magneto-resistors may be used to measure the earth's magnetic field.

Additionally or alternatively, the quality metric may be generated based on comparing the GNSS azimuth wander with the movement of the antenna alignment device determined by one or more accelerometers. If the antenna alignment device is stationary but the GNSS based azimuth wanders, the quality of the azimuth may be indicated as low. Or, if the antenna alignment device is moving, but the GNSS wander is out of proportion (i.e., not commensurate) with the movement, then the quality of the azimuth may be indicated as low.

The quality metric may then be displayed alongside the GNSS based azimuth calculation. In one or more embodiments, the quality metric may be in between 0-100 and or expressed as a percentage.

Figure 1:
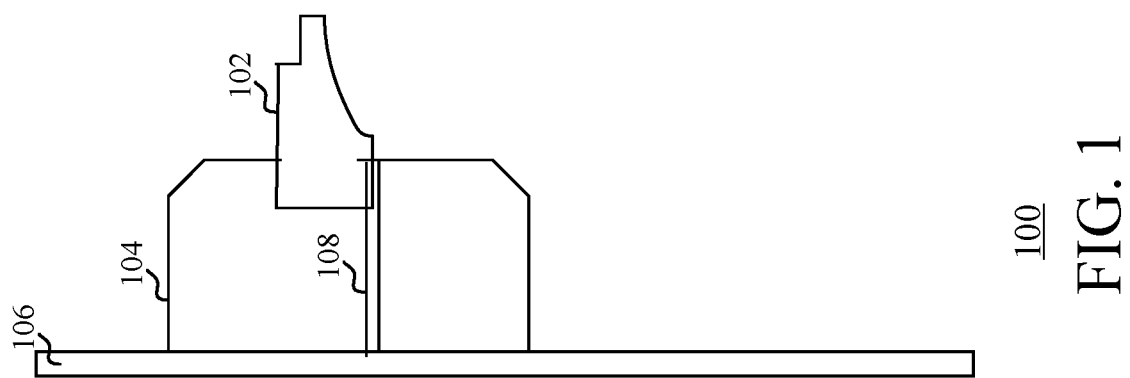
FIG. 1 shows an example antenna alignment environment, based on the principles disclosed herein.

FIG. 1 shows an example antenna alignment (also referred to as antenna tuning) environment 100, based on the principles disclosed herein. The example environment 100 includes an antenna 104, which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, loop antenna, Yagi-type antenna, and or any type of antenna that may have to be aligned for optimal performance. Although the antenna 104 is described herein as a singular antenna, a combination of antennas (including active antenna arrays) that may have to be aligned should also be considered within the scope of this disclosure. The antenna 104 may use any kind of transmit/receive frequency, e.g., the antenna 104 may be a microwave antenna used in a cellular communications tower.

An antenna alignment device 102 may be attached to the antenna 104 using a coupler 108. The antenna alignment device 102 may include any type of cameras, sensors, displays, magnetometers, magneto-resistors, accelerometers, voltmeters, and or other components configured to align (or tune) the antenna 104. When coupled to the antenna 104, the orientation of the antenna alignment device 102 may correspond to the orientation of the antenna 104. The alignment may include parameters such as roll, pitch (also referred to as tilt), and or azimuth; as understood in the art.

Figure 2:
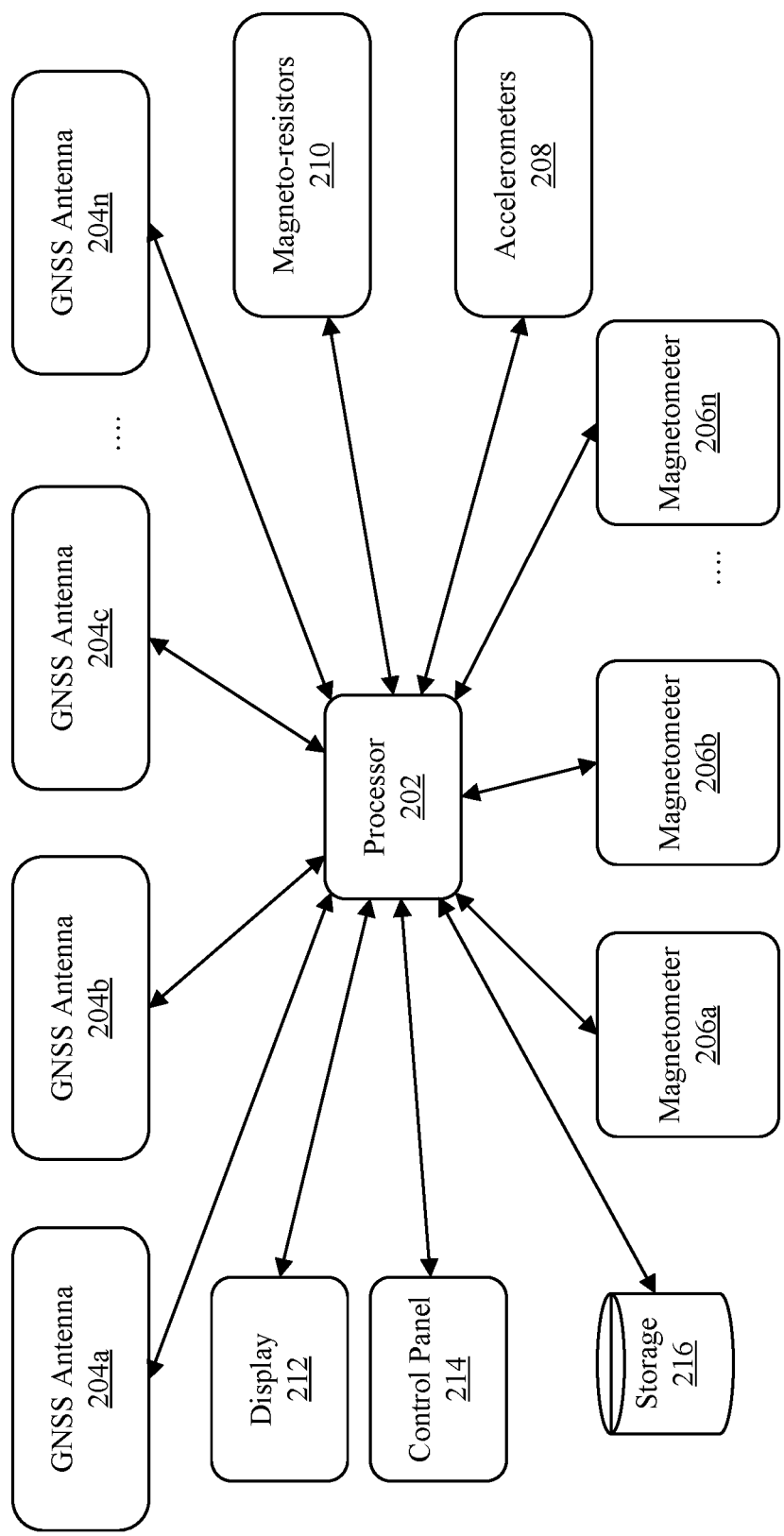
FIG. 2 shows an example architecture of an antenna alignment device, based on the principles disclosed herein.

FIG. 2 shows an example architecture 200 of an antenna alignment device (e.g., antenna alignment device 102 shown in FIG. 1), based on the principles disclosed herein. As shown in the architecture 200, the antenna alignment device may comprise components such as a processor 202, GNSS antennas 204a-204n (collectively referred to as GNSS antennas 204 and commonly referred to as GNSS antenna 204), magnetometers 206a-206n (collectively referred to as magnetometers 206 and commonly referred to as magnetometer 206), accelerometers 208, magneto-resistors 210, a display 212, a control panel 214, and a storage device 216. It should be understood that these components are shown and described as mere examples; and antenna alignment devices with additional, alternate, and fewer number of components should also be considered within the scope of this disclosure. For instance, in addition to the specific sensors described, the antenna alignment device may have additional sensors, e.g., optical cameras or infrared cameras.

The processor 202 may include any kind of processing components that may receive data from the other components, perform calculations on the received data, and provide a response (e.g., a control signal to the components or a communication signal to other devices) based on the calculations. The processor 202 may also control the overall operation of the antenna alignment device. Examples of the processor 202 may include controllers, microprocessors, discrete logical components, and or any type of components configured to perform processing operations described herein. The processor 202 may be coupled to a non-transitory computer readable medium/memory (not shown) that may store computer program instructions that the processor 202 may execute to realize the functionality described herein. Although the example processor 202 is shown as a single component, it should be understood the processor 202 may include multiple components, such as multiple processors. It should be further understood that a portion of the processing operations may occur outside the antenna alignment device.

The GNSS antennas 204 (in one embodiment, a pair of GNSS antennas) may communicate with constellations of GNSS satellites to calculate the corresponding positions (e.g., geolocations) of the GNSS antennas 204. A GNSS receiver may be connected to the GNSS antennas 204. More particularly, the GNSS antennas 204 may receive GNSS signals broadcasted by the visible constellation of GNSS satellites, and the GNSS receiver may use the attributes of the signals (e.g., time of the broadcast embedded in the GNSS signals) to geolocate the GNSS antennas. Geolocating may include determining latitude, longitude, altitude, and or other attributes associated with determining the corresponding geolocations. When geolocations of multiple GNSS antennas 204 is determined by the GNSS receiver, the processor 202 may use these geolocations to determine positional parameters of the antenna alignment device, such as its azimuth. As discussed above, the azimuth calculations solely based on GNSS antennas 204 may not necessarily be accurate. For example, the visibility of the GNSS satellites may be affected by tall structures, and there may be RF interference in the received GNSS signals. Therefore, even though the technician may be provided with a GNSS based azimuth value, the underlying GNSS measurements may still be wandering. The embodiments disclosed herein provide an extra piece of information, a quality metric, alongside the GNSS based azimuth value. Particularly, other sensors may be used to calculate an azimuth value and compare it to the GNSS based azimuth value. Additionally or alternatively, motion—or lack thereof—of the antenna alignment device may be detected to determine whether the wander of the GNSS value is caused by the movement of the device or the inaccuracies (e.g., obstructed view of GNSS satellites, RF interference, etc.) in measuring the GNSS based position of the antenna alignment device.

For example, magnetometers 206 may be used to measure the azimuth (e.g., an instantaneous azimuth) of the antenna alignment device. In one or more embodiments, the magnetometers 206 may include any type of sensor that may measure the earth's magnetic field at a corresponding location. The magnetometers 206 may use any kind of measuring technology such as Hall effect. The measuring technology may further include measuring effects of the earth's magnetic field on an electric current moving through a circuit. Regardless of the measurement technology, the magnetometers 206 may generate a vector measurement of the earth's magnetic field. The vector measurement may be in a Cartesian system, with the X direction being parallel to earth's magnetic north-south axis, the Y-direction being in the earth's east-west axis, and the Z-direction being perpendicular to the plane of the surface of the earth. The measured earth's magnetic field vector B may therefore have corresponding intensities in each of the above three directions. The scalar magnitude of this vector measurement (i.e., square root of $(X^2+Y^2+Z^2)$), which may be measured in Gauss or Tesla, may be referred to as total intensity of the magnetic field vector B. Other parameters such as inclination and declination, may be calculated through the orthogonal X, Y, Z components of the field vector B. The magnetometers 206 may provide these measurements to the processor 202, which may use the measurements to calculate the instantaneous azimuth of the antenna alignment device. Although multiple magnetometers 206 are shown in FIG. 2 and described herein, architectures with a single magnetometer 206 should also be considered within the scope of this disclosure.

In some embodiments, multiple magnetometers (e.g., at least three magnetometers) 206 arranged in a reference plane may be used. These magnetometers 206 may be arranged, for example, within a PCB of a known plane with reference to the antenna alignment device. In other examples, the magnetometers 206 may be in different parallel planes. Orientations of the established reference plane with, for example, the earth's surface may be used to calculate the azimuth of the antenna. It should however be understood that the plane formed by three magnetometers 206 is merely an example and any number of magnetometers may be used within the antenna alignment device.

Alternatively or additionally, magneto-resistors 210 may be used to calculate the instantaneous azimuth of the antenna alignment device. The magneto-resistors 210 may measure the earth's magnetic field based on its effect on a resistor, whose resistance changes according to the earth's magnetic field. Similar to the magnetometers 206, the magneto-resistors 210 may measure the earth's magnetic field as a vector quantity. The magneto-resistors 210 may provide the measured earth's magnetic field to the processor 202, which may then calculate the instantaneous azimuth of the antenna alignment device.

The processor 202 may compare the instantaneous azimuth value based on the measurements from the magnetometers 206 and or the magneto-resistors 210 to determine a quality metric for the GNSS antennas 204 based azimuth value. For example, the quality metric may be proportional to the difference between the GNSS antennas 204 based azimuth value and the instantaneous azimuth value. That is, a higher difference may indicate a lower quality metric and lower difference may indicate a higher quality metric. In one or more embodiments, the quality metric may range from 0 to 100, 0 being the lowest quality metric and 100 being the highest quality metric.

The wandering of GNSS antennas 204 based azimuth value may be detected by using the accelerometers 208. The accelerometers 208 may include any type of accelerometer that may be used to detect the orientation—and movement—of the antenna alignment device (e.g., based on the change in orientation) with respect to the earth's surface. For instance, multiple accelerometers 208 may measure the direction of gravitational pull at corresponding locations, and, based on comparing the directions, may detect the orientation of the antenna alignment device. The orientation may include, for example, roll and tilt of the antenna alignment device. The processor 202 may determine that the GNSS antenna 204 based azimuth calculation is wandering if the accelerometers 208 indicate a static orientation. In other words, the change in the azimuth values is not caused by the movement of the antenna alignment device but other factors (e.g., RF interference, one or more GNSS satellites moving out of view). The processor 202 may then use the information that the antenna alignment device has remained stationary or has exhibited some movement to calculate the quality metric for the GNSS antennas 204 based azimuth calculation. For example, if the accelerometers 208 indicate that the antenna alignment device has not moved, but there is a significant wandering of the GNSS antennas 204 based azimuth value, the quality metric may be low. On the flip side, if the antenna alignment device has moved and there is a commensurate wandering of the GNSS antennas 204 based azimuth value, the quality metric may still be high. In other words, if the wandering of the GNSS antennas 204 based azimuth value is out of proportion with the movement of the antenna alignment device as measured by the accelerometers 208, the processor 202 may indicate a low quality metric. The accelerometers 208, it should be noted, are described just as examples and any kind of inertial motion sensor and or tilt sensor should be considered within the scope of this disclosure.

In one or more embodiments, the wandering of the azimuth value based on the GNSS based measurements and the magnetometers 206/accelerometers 208/magneto-resistors 210 based measurements are determined over time. For example, the comparison may be in the order of tens of seconds, the difference in the measurements (e.g., delta values) and the variance thereof may be considered in addition to or as an alternate to the instantaneous comparison. If there is large difference and or variation over time, the quality metric may be low compared to situations where there is a smaller difference or variation over time.

The display 212 may be any kind of display, such as an LCD (Liquid Crystal Display) or LED (Light Emitting Diode) display. The display may be touchscreen and provide the user with configurable parameters (e.g., rendered as options in a graphical user interface) that may be used for customizing the functionality of the antenna alignment device. The display 212 may show both the GNSS antennas 204 based azimuth value and the quality metric. This combination allows a technician how far the GNSS antennas 204 (e.g., in tandem with the GNSS receivers) based azimuth value is to be trusted.

The control panel 214 may comprise buttons, dials, capacitive touch screens, and or any other type of input components used to configure the functionality of the antenna alignment device. For instance, the control panel 214 may be used to calibrate the antenna alignment device, start a communication between the antenna alignment device and an external device, configure the display 212 (e.g., by changing the zoom level), and or change any other functionality of the antenna alignment device.

The storage device 216 may include any type of storage technology. For example, the storage device 216 may include random access memory (RAM), read only memory (ROM), solid state drive, hard drives, and or any other type of storage technology. The storage device 216 may store one or more azimuth values calculated by the processor 202 based on the measurements by the GNSS antennas 204. Furthermore, the storage device 216 may store the azimuth values calculated by the processor 202 based on the measurements by the magnetometers 206 and or the magneto-resistors 210. The storage device 216 may further store data associated with orientation and or movement of the antenna alignment device as measured by the accelerometers.

Figure 3:
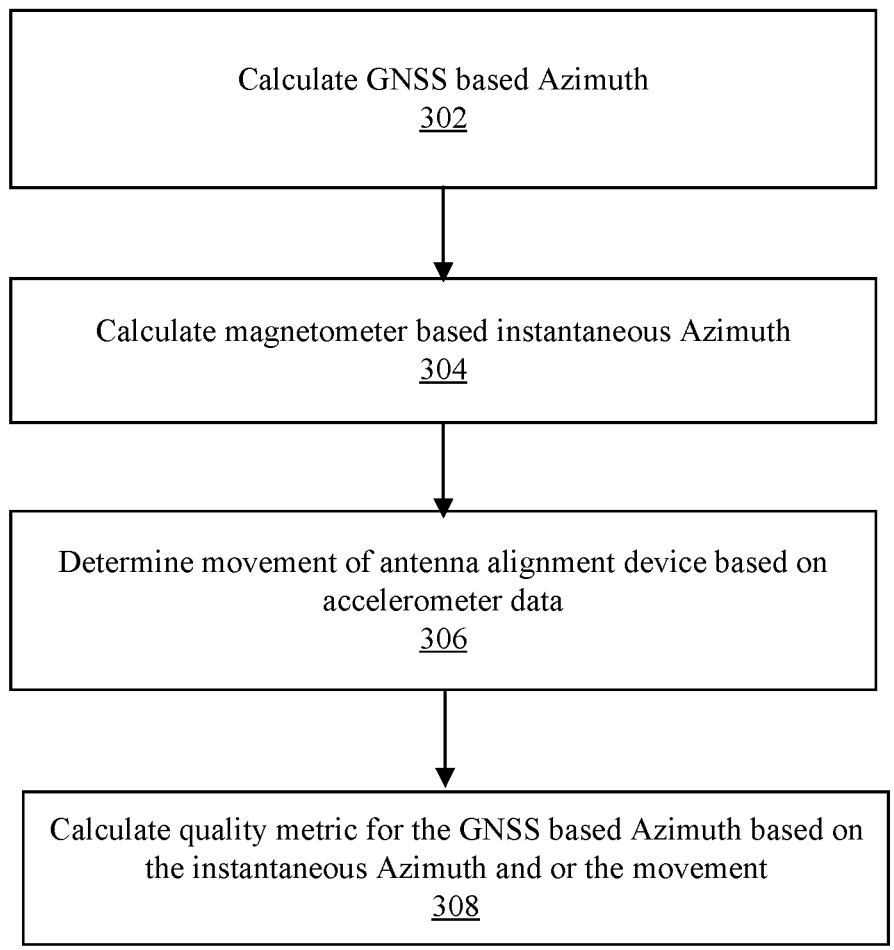
FIG. 3 shows a flow diagram of an example antenna alignment method, based on the principles disclosed herein.

FIG. 3 shows a flow diagram of an example antenna alignment method 300, based on the principles disclosed herein. The method 300 may be performed by one or more components in the antenna alignment environment 100, particularly the antenna alignment device 102. The steps of the method 300 are merely examples and therefore should not be considered limiting. Other methods with additional, alternative, or fewer number of steps should also be considered within the scope of this disclosure.

At step 302, a GNSS based azimuth is calculated. Particularly, multiple GNSS antennas (e.g., a pair in tandem with a GNSS receiver) within an antenna alignment device may communicate with one or more constellations of GNSS satellites to determine corresponding positions (e.g., geolocations) of the GNSS antennas. These corresponding positions may then be used by a processor within the antenna alignment device to calculate the azimuth of the antenna alignment device. This calculation, however, may wander due to factors such as RF interferences, visibility of the GNSS satellites, etc. Therefore, the below steps determine a quality metric for the GNSS based azimuth calculation.

At step 304, magnetometer based instantaneous azimuth is calculated. For example, a magnetometer array may be provided within the antenna alignment device, where the magnetometer array may measure the earth's magnetic field. Based on this measurement, an instantaneous azimuth may be calculated by the processor. It should be understood that the magnetometers used for an instantaneous calculation of azimuth are just provided as examples, and any kind of calculation of instantaneous azimuth should be considered within the scope of this disclosure. For example, magneto-resistors may be used for the instantaneous azimuth calculation in addition to or as an alternate to the magnetometer-based azimuth calculation.

At step 306, a movement of the antenna alignment device is determined based on the accelerometer data. For example, 3-dimensional accelerometers may be used to determine the orientation of the antenna alignment device. The orientation change if the device moves—and therefore the accelerometers may be used to determine the movement of the antenna alignment device.

At step 308, a quality metric for the GNSS based azimuth may be calculated based on the instantaneous azimuth and or the movement. For example, if the instantaneous azimuth deviates from the GNSS based azimuth by a delta value, the quality metric may be inversely proportional to the delta value. That is, a higher delta value will result in a lower quality metric and a lower delta value will result in a higher quality metric. Furthermore, if the antenna alignment device has not moved and the GNSS based azimuth has wandered, this condition may indicate that the wandering is generated by other factors and not the movement of the device, thereby indicating a lower quality for the GNSS based azimuth. Alternatively, if the GNSS based azimuth wanders out of proportion with the movement of the antenna alignment device, this too will indicate a lower quality for the GNSS based azimuth. The quality metric may then be displayed alongside the GNSS based azimuth.

In one or more embodiments, the quality metric may be based on differences and the variations thereof over time (e.g., tens of seconds). That is, a difference (e.g., delta values) in the GNSS based azimuth and the magnetometer/accelerometer-based azimuth are calculated over time and the variation of the delta values are determined. Larger delta values and or a larger variance thereof may indicate a significant wander through time, and therefore may indicate a lower quality metric. Smaller delta values and or smaller variances thereof may indicate a higher quality metric. Therefore, any type of comparison within any type of time frame should be considered within the scope of this disclosure.

It should however be understood that these are just a few examples of using alternate and or additional independent measurements to determine a quality of the GNSS based azimuth. Any kind of measurement to determine such quality should also be considered within the scope of this disclosure.

Figure 4:
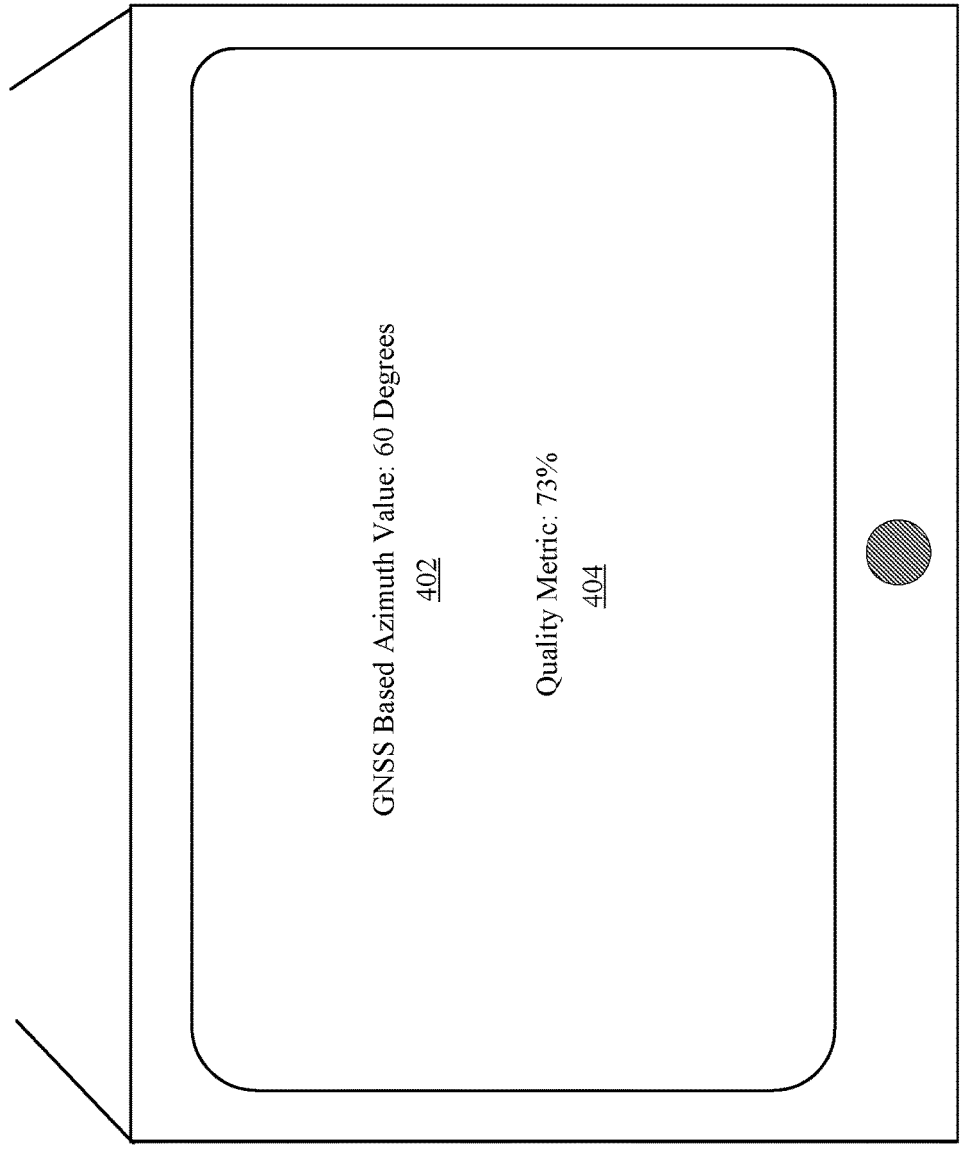
FIG. 4 shows an example display generated by an antenna alignment device, based on the principles disclosed herein.

FIG. 4 shows an example display 400 generated by an antenna alignment device (e.g., antenna alignment device 102 in FIG. 1), based on the principles disclosed herein. It should be understood that the display 400 is just an example and any kind of display generated by the antenna alignment device should be considered within the scope of this disclosure. As shown, the display shows a GNSS based azimuth value 402 and a quality metric 404. If the GNSS based azimuth value 402 is wandering, then the quality metric 404 may have a lower value; and if the GNSS based azimuth value is relatively stable, the quality metric 404 may have a higher value. As shown, the quality metric 404 may be expressed in a percentage. But any other type of range should be considered within the scope of this disclosure. Furthermore, one or more of the GNSS based azimuth value 402 and the quality metric 404 may be shown graphically.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An antenna alignment device comprising:
a plurality of global navigation satellite system (GNSS) antennas configured to receive signals from a constellation of GNSS satellites;

a plurality of components configured to measure non-GNSS based positional attributes of the antenna alignment device; and a processor configured to:
calculate a first azimuth value of the antenna alignment device based on the signals received by the plurality of GNSS antennas;
calculate a second azimuth value of the antenna alignment device based on the non-GNSS based positional attributes;
generate a quality metric for the first azimuth value based on a comparison of the first azimuth value and the second azimuth value; and
cause a display of the first azimuth value and the quality metric.

2. The antenna alignment device of claim 1, wherein the plurality of components configured to measure the non-GNSS based positional attributes comprises a plurality of magnetometers.

3. The antenna alignment device of claim 2, wherein the plurality of magnetometers are arranged in an array.

4. The antenna alignment device of claim 1, wherein the plurality of components configured to measure the non-GNSS based positional attributes comprises a plurality of magneto-resistors.

5. The antenna alignment device of claim 1, wherein the plurality of GNSS antennas comprises a pair of GNSS antennas.

6. The antenna alignment device of claim 1, wherein the quality metric is between 0 and 100.

7. The antenna alignment device of claim 1, further comprising:
a plurality of accelerometers configured to measure movement of the antenna alignment device; and
the processor being configured to calculate the quality metric further based on the measurements from the plurality of accelerometers.

8. An antenna alignment device comprising:
a plurality of global navigation satellite system (GNSS) antennas configured to receive signals from a constellation of GNSS satellites;
a plurality of components configured to measure non-GNSS based positional attributes of the antenna alignment device; and
a processor configured to:
calculate an azimuth value of the antenna alignment device based on the signals received by the plurality of GNSS antennas;
generate a quality metric for the azimuth value based on the non-GNSS based positional attributes; and
cause a display of the azimuth value and the quality metric.

9. The antenna alignment device of claim 8, wherein the plurality of components configured to measure the non-GNSS based positional attributes comprises a plurality of accelerometers configured to measure movement of the antenna alignment device.

10. The antenna alignment device of claim 8, wherein the plurality of components configured to measure the non-GNSS based positional attributes comprises a plurality of magnetometers.

11. The antenna alignment device of claim 10, wherein the plurality of magnetometers are arranged in an array.

12. The antenna alignment device of claim 8, wherein the plurality of components configured to measure the non-GNSS based positional attributes comprises a plurality of magneto-resistors.

13. The antenna alignment device of claim 8, wherein the plurality of GNSS antennas comprises a pair of GNSS antennas.

14. The antenna alignment device of claim 8, wherein the quality metric is between 0 and 100.

15. An antenna alignment method comprising:
receiving, by a plurality of global navigation satellite system (GNSS) antennas in an antenna alignment device, signals from a constellation of GNSS satellites;
measuring, by a plurality of components in the antenna alignment device, non-GNSS based positional attributes of the antenna alignment device;
calculating, by a processor of the antenna alignment device, a first azimuth value of the antenna alignment device based on the signals received by the plurality of GNSS antennas;
calculating, by the processor, a second azimuth value of the antenna alignment device based on the non-GNSS based positional attributes;
generating, by the processor, a quality metric for the first azimuth value based on a comparison of the first azimuth value and the second azimuth value; and
causing, by the processor, a display of the first azimuth value and the quality metric.

16. The method of claim 15, wherein the plurality of components measuring the non-GNSS based positional attributes comprises a plurality of magnetometers.

17. The method of claim 16, wherein the plurality of magnetometers are arranged in an array.

18. The method of claim 15, wherein the plurality of components measuring the non-GNSS based positional attributes comprises a plurality of magneto-resistors.

19. The method of claim 15, wherein the plurality of GNSS antennas comprises a pair of GNSS antennas.

20. The method of claim 15, further comprising:
measuring, by a plurality of accelerometers in the antenna alignment device, movement of the antenna alignment device; and
calculating, by the processor, the quality metric further based on the measurements from the plurality of accelerometers.

* * * * *